United States Patent Office 3,140,344
Patented July 7, 1964

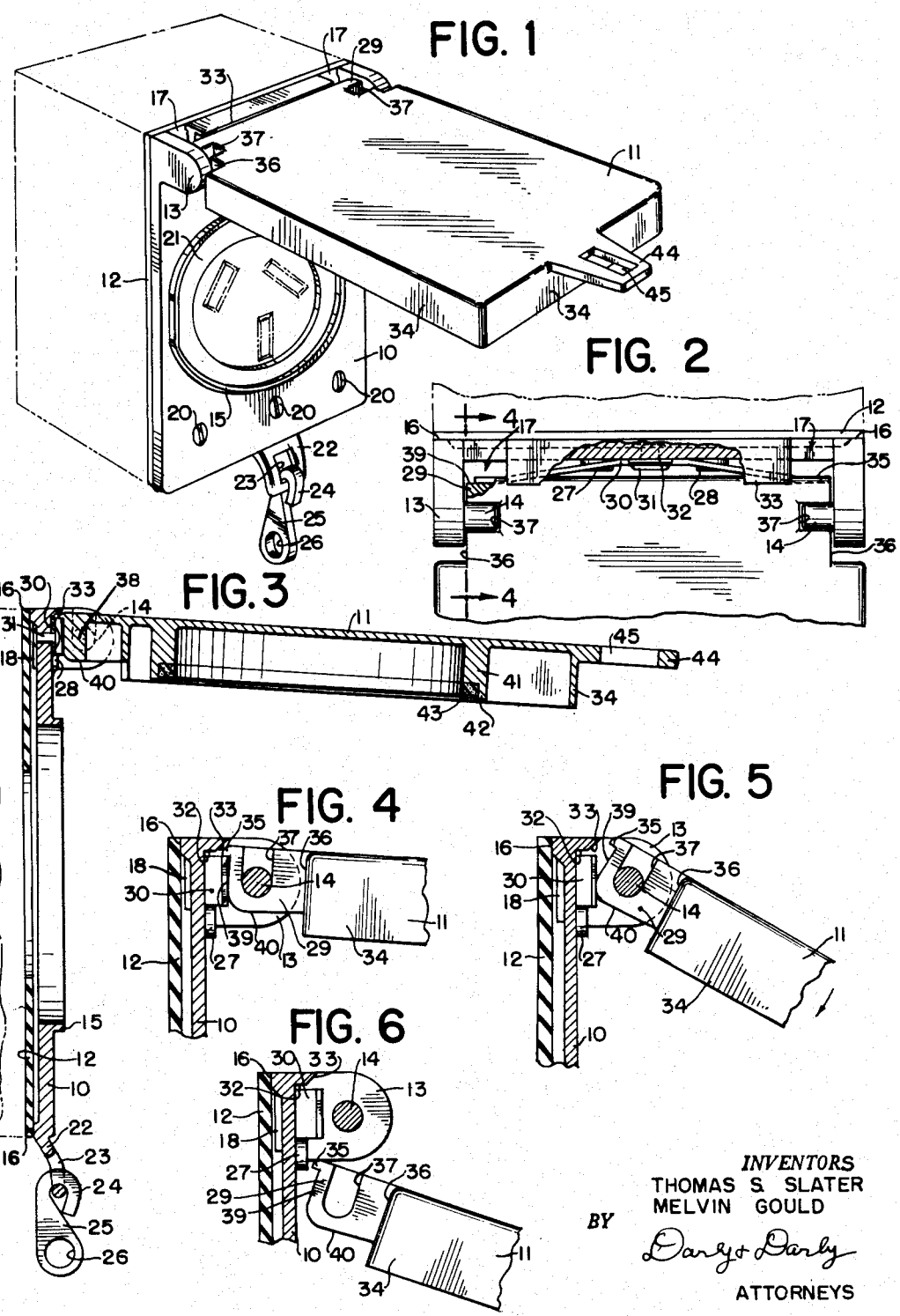

3,140,344
WEATHERPROOF RECEPTACLE COVER
Thomas S. Slater, Great Neck, and Melvin Gould, Laurelton, N.Y., assignors to Slater Electric Inc., Glen Cove, N.Y., a corporation of New York
Filed Feb. 27, 1962, Ser. No. 175,923
5 Claims. (Cl. 174—67)

The present invention relates to a weatherproof cover for electrical receptacles which are mounted in outlet boxes. Mroe particularly still the invention relates to such a weatherproof cover which is hinged to give ready access to the receptacle and which is so constructed that the hinged cover be readily removed from the base portion which is normally fixed to the outlet box in which the receptacle or other wiring device is housed.

By means of mounting the cover proper to its base in the manner hereinafter described, the assembly of the device is facilitated and the cost of it thereby reduced. In addition, the ready removability of the cover permits the base portion to be fastened to the outlet box with great ease. Additionally, the ready removability of the cover makes it possible, when the receptacle is in use, to place an appliance plugged into the receptacle against the wall or other structure on which the outlet box is mounted without interference from the open cover.

The outlet cover of the present invention is also provided with means for locking it in closed position which is frequently desirable since such weatherproof receptacles are normally in the open and available to everyone. The locking feature thus prevents access by those who are not authorized to draw power from the particular receptacle.

It is an object of the invention to provide a weatherproof electrical wiring receptacle cover which cover is readily assembled at a minimum cost.

It is another object of the invention to provide such a receptacle having means urging it either to its open or its closed position.

It is still another object of the invention to provide such a weatherproof cover which is readily removed from its base portion to thereby facilitate fastening of the base portion to the outlet box with which it is used.

It is a still further object of the invention to provide means for locking the cover in its closed position to thereby prevent unauthorized persons from using the power outlet, this locking means also serving to prevent removal of the cover from its base since this removal can only be effected when the cover is in a partially open position.

Other objects and features of the invention will be apparent when the following description is considered in connection with the annexed drawing, in which—

FIGURE 1 is a perspective view of the outlet cover of this invention shown in position on an outlet box which has a power outlet installed therein;

FIGURE 2 is a top plan view of the device of FIGURE 1 taken with the cover open as shown in FIGURE 1;

FIGURE 3 is a cross-sectional view of the weatherproof cover and its base, the section being taken along the longitudinal center line of the device with the cover in open position as shown in FIGURE 1;

FIGURE 4 is a fragmentary cross-sectional view taken on the plane of the line 4—4 of FIGURE 2 and showing particularly a mode of hinging the cover to its base as well as the mode of retaining the cover in its open position and limiting the movement of the cover to the desired open position;

FIGURE 5 is a view substantially identical to FIGURE 4 save that the cover has been rotated to a position such that it can be removed from the base portion; and FIGURE 6 is substantially identical to FIGURES 4 and 5 save that in FIGURE 6 the cover is shown removed from the base portion.

Referring now to the drawings and particularly to FIGURE 1, it will be seen that the weatherproof cover of the present invention consists essentially of three parts, the plate or base 10, the cover proper 11 and the gasket 12. The base 10 is a plate-like member having ears 13 integral therewith. Each of the ears 13 has a pin 14 on its inner face, these pins being integral with the ears and facing each other as clearly shown in FIGURE 2.

Plate 10 also has an outwardly extending generally circular flanged portion 15 formed thereon which portion mates with a sealing gasket in the cover member 11 as will subsequently be described. Additionally plate 10 has a rib 16 on the rear surface thereof extending completely around the margin of the box except for the areas 17 (FIGURE 1).

In order to assure sealing of the plate 10 to the box at all areas, auxiliary ribs 18 extend downwardly at the inner sides of the slots 17 and thence to the side at the base of the slot 17. Thus the ribs 16 and 18 together bear against the rubber gasket 12 in such a manner as to assure that there will be no moisture penetrating into the box through the joint between the plate 10 and the outer rim of the box. As indicated in FIGURE 1, the plate 10 is fixed to the box by means of screws 20 which, in the usual manner, are threaded into openings in end plates which are fixed to the box and which end plates also serve as mountings for the usual receptacle or other wiring device mounting strap.

As indicated in FIGURE 1, the rubber gasket member 12 is provided with an opening therein which fits tightly about the forward portion of the periphery of a receptacle mounted in the box. In order to accommodate receptacles of different sizes a rubber gasket is provided with prescored circular portions so that by removing an annular ring a larger receptacle may be utilized, the removable annular ring being shown at 21 (FIGURE 1).

It will be noted that another such annular ring has been removed which annular ring would make it possible to use a receptacle having a smaller forward portion. The particular receptacle shown is a heavy duty receptacle of larger size than the usual single plug receptacle.

Also formed integrally with the plate 10 is a downwardly extending projecting member 22 having an aperture 23 therein. Bent about the lower bar of member 22 is a hook 24 which terminates in a large portion 25, having an aperture 26 therein. The member 22 serves, as will hereinafter appear, to lock the cover to the base or plate 10 and thus prevent unauthorized use of the receptacle, additionally preventing removal of the cover from the base plate or of the base plate from the outlet box.

Formed integrally with the plate 10 are the small bosses 27 and 28 lying beneath a generally arcuately formed leaf spring 30 which leaf spring extends horizontally being riveted to the plate 10 at its center by means of the rivet 31 and being prevented from rotating by the bosses 27 and 28 bearing against the bottom edge of the spring as well as by the boss 32 bearing against the central portion of the upper edge of the spring.

Formed on the upper edge of plate 12 between the slots 17 is a forwardly extending flange 33 which, as is indicated clearly in FIGURE 1, prevents there being a gap between the cover 11 and the plate 10 when the cover is in its open position as shown in FIGURE 1.

The cover 11 is formed in one piece as by die casting and is of generally rectangular shape conforming to the shape of the plate or base 10 and having flanges 34 on three sides of the cover extending toward the base 10 when in closed position and in fact substantially seating against the edges of the base 10. On its fourth side the cover has a small flange or lip 35 which, as seen particularly in FIGURE 2, strikes the upper edge of the spring 30 when the cover is in open position thereby limiting the open movement to substantially that shown in FIGURE 2.

Cover 11 has notches 36 formed in its upper edges providing space for the ears 13 of the base. Extending laterally inward from the notched portions 36 and formed in a thickened flange 29 (FIG. 4) are slots 37 which slots cooperate with the pins 14 to provide for pivoting of the cover upon the base.

As will be seen in the drawings, particularly FIGURES 4 through 6, the spring 30 bears against an inwardly extending flange 38 at the top of the cover 11 and thus causes the pins 14 to seat against the base of the slots 37. The spring 30 also cooperates with the bottom edge 40 of the inwardly extending flange 38 to retain the cover in its closed position.

Because of the arrangement of pins 14, slots 37 and the faces 39 and 40 of the flange 38, it is possible to remove the cover by pivoting it to the position shown in FIGURE 5 and then pressing rearwardly against the tension of spring 30 while simultaneously pressing downwardly so that the slots 37 disengage from the pins 14. This arrangement makes the disassembly of the cover 11 from the base 10 very simply performed and, in addition, serves to expose the upper pair of holes for screws 20, thereby facilitating the fastening of the plate 10 to the outlet box. The cover is of course replaced on the base by following the reverse procedure, that is, by placing the cover in position with the face 39 of flange 38 bearing against the spring 30 and pressing rearwardly until the pins 14 enter the slots 37 thereafter pressing generally upwardly until the pins seat in the rounded bottoms of the notches 37.

It will be noted that the rim 34 is deeper than the thickness of cover extension 29 and that it is therefore impossible for the cover 11 when in the closed position to be moved toward the plate to thereby release the pins 14 from the slots 37. Thus the cover cannot be removed from the plate while in the closed position and therefore when the cover is locked to the plate by use of the locking means hereinafter described, no removal of the cover is possible.

It will be observed that the lip 35 not only limits the opening movement of the cover but also prevents inadvertent separation of the cover from base by downward movement of the cover when in an open position since, as stated above, the lip 35 overlies the spring 30 and prevents such downward movement.

Formed integrally with cover 11 is a generally circular inwardly extending flange 41 having a shoulder 42 formed in its periphery. Mounted in the recess 42 is a sealing gasket 43 which mates with the outwardly extending rim or flange on base 10 thereby serving to seal the opening when the cover is in closed position, thus assuring that no moisture will penetrate into the outlet box or into the receptacle.

Also formed integrally with the cover 11 is an eye member 44 having the central opening 45. This opening cooperates with the hook member 22 already described so that the shank 25 of the hook may extend through the opening and serve to lock the cover in position by inserting the hasp of a padlock or the like through the opening 26 in the hook 22.

As will be obvious from the above description we have provided a cover structure for an outlet box and the receptacle therein which assures that the weatherproof condition of the box and receptacle be maintained at all times, the cover structure being so designed that its assembly is very simply and easily performed from a minimum number of elements there being no separate hinge pins or apertures and no necessity for mounting hinge pins in aligned holes in the base and cover portions. It will also be apparent that the structure provides means for holding the cover in either its open or its closed position as well as means for locking the cover in closed position to prevent unauthorized use of the wiring device in the outlet box.

Moreover, the cover member may readily be removed from the base for the purpose of facilitating the mounting of the base on the outlet box. It is to be noted that the pins 14 are provided on the forwardly extending ears of the base plate 10 and cooperate with slots in the cover member 11 and that the position of these parts cannot be reversed while retaining the parts in their relative positions since were this attempted there would be no way of retaining the cover in position relative to the base particularly when the cover was in its downward or closed position.

While the cover has been described as being of substantially the same size and shape as the base plate 10, it will be understood that this is not essential and that the cover might be substantially of the size of the receptacle face only, the base plate then being formed with a rim or flange 15 of substantially the size of the outer periphery of the receptacle face and the cover with a mating sealing element of substantially the same size and corresponding generally with the sealing elements 41 through 43. It will also be obvious that the hinging arrangement disclosed herein might be utilized not only with a single outlet, but might also be utilized in connection with the two cover members for a duplex outlet of the type disclosed in Patent No. 2,985,334, issued to Saul I. Slater on May 23, 1961, and assigned to the assignee of this application.

While we have described a preferred embodiment of our invention, it will be understood that we wish to be limited not by the foregoing description, but solely by the claims granted to us.

What is claimed is:

1. In a weatherproof cover for an electrical outlet box and a plug receptacle mounted therein, of the type having a plate adapted to be fixed to the box covering the open side thereof, having an opening therein through which the plug receptacle extends, and having a cover mounted on the plate and extending over the opening and receptacle in one position thereof; the improvement comprising; a pair of spaced apart outwardly extending ears on said plate; a pin on each said ear; said pins extending parallel to the surface of said plate, lying on a common axis and facing each other; a cover extension lying between said pins, said cover extension being thickened at each side thereof facing said ears, each said thickened portion having a slot extending perpendicular to the plane of said plate when said cover is in closed position, said slots being open at the end remote from said plate, each said plate pin extending into a respective one of said slots to thereby pivotally mount said cover on said pins; resilient means for holding said cover in position with said pins seated against the inner closed end of said slots in said cover extension and a rim extending around said cover member and extending perpendicular to the face thereof and perpendicular to the cover plate when the cover is in closed position, said rim being of greater extent than the thickness of said thickened portions of said cover extension, thereby preventing movement of said cover while in closed position in a direction to release said pins from said slots.

2. A weatherproof cover in accordance with claim 1 wherein said resilient means comprises a leaf spring, said spring being fixed to said plate and having its ends bearing against the rear edge of the thickened portion of said cover extension when the cover is in closed position and against the rearwardly extending edge of said thickened portions when the cover is in open position to thereby hold the cover in either its closed or open position.

3. A device according to claim 2 wherein said cover extension is provided with an edge extending to the rear when said cover is in open position, said edge being coextensive with the areas of contact of said leaf spring with the rearwardly extending edge of said cover extension, and lying in the plane of the surface of said cover, said edge cooperating with said leaf spring to limit the opening movement of said cover, thereby preventing the pins from leaving their respective slots when the cover is in open position whereby said cover extension slots may be removed from the cooperating pins by pivoting said cover to a partially open position, pressing inwardly and downwardly to thereby overcome the urge of said leaf spring and thus remove the cover from the plate.

4. A weatherproof cover in accordance with claim 1 wherein said plate has a hook pivotally mounted thereon and said cover has an eye fixed thereto, said hook and eye cooperating to form means for locking said cover in its closed position.

5. A weatherproof cover in accordance with claim 4 wherein said plate and said cover are substantially coextensive, whereby when said cover is in locked closed position the means mounting the cover assembly on the outlet box is rendered inaccessible.

References Cited in the file of this patent

UNITED STATES PATENTS

| 699,483 | Brady | May 6, 1902 |
| 2,985,334 | Slater | May 23, 1961 |
| 2,987,214 | Radack | June 4, 1961 |